United States Patent
Horoun et al.

(10) Patent No.: US 9,120,064 B2
(45) Date of Patent: Sep. 1, 2015

(54) DISTRIBUTOR TRAY FOR OFFSHORE GAS/LIQUID CONTACT COLUMN

(71) Applicant: IFP Energies nouvelles, Rueil-Malmaison Cedex (FR)

(72) Inventors: Yacine Horoun, Grigny (FR); Ludovic Raynal, Oullins (FR); Pascal Alix, Roussillon (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 218 days.

(21) Appl. No.: 13/865,234

(22) Filed: Apr. 18, 2013

(65) Prior Publication Data

US 2013/0277869 A1 Oct. 24, 2013

(30) Foreign Application Priority Data

Apr. 18, 2012 (FR) ..................... 12 01143

(51) Int. Cl.
*B01F 3/04* (2006.01)
*B01D 3/00* (2006.01)

(52) U.S. Cl.
CPC ............ *B01F 3/04496* (2013.01); *B01D 3/008* (2013.01); *B01F 3/04078* (2013.01); *B01F 3/04468* (2013.01)

(58) Field of Classification Search
CPC .... B01F 3/04; B01F 3/04078; B01F 3/04021; B01F 3/04496; B01F 3/04468; B01F 3/0446; B01D 53/18
USPC ............. 261/97, 110, 113, 114.1, 114.5, 117; 95/236
See application file for complete search history.

(56) References Cited

U.S. PATENT DOCUMENTS

| | | | |
|---|---|---|---|
| 4,820,455 A * | 4/1989 | Kunesh et al. ................. | 261/96 |
| 5,132,055 A | 7/1992 | Alleaume et al. | |
| 5,752,538 A | 5/1998 | Billingham et al. | |
| 6,149,136 A | 11/2000 | Armstrong et al. | |
| 6,294,053 B1 | 9/2001 | Darredeau | |
| 6,338,774 B1 | 1/2002 | Lehman | |
| 6,395,138 B1 | 5/2002 | Darredeau | |
| 6,536,233 B2 * | 3/2003 | Darredeau et al. ............. | 62/643 |
| 2004/0020238 A1 | 2/2004 | Kalbassi et al. | |

FOREIGN PATENT DOCUMENTS

FR 2 771 018 A1 5/1999
FR 2 771 019 A1 5/1999

OTHER PUBLICATIONS

Hirt, C.W. and Nichils, B.D.: "Volume of Fluid (VOF) Mehtod for the Dynamics of Free Boundaries", Journal of Computational Physics, vol. 39, pp. 201-225 (1981).

* cited by examiner

*Primary Examiner* — Robert A Hopkins
(74) *Attorney, Agent, or Firm* — Fitch, Even, Tabin & Flannery LLP

(57) ABSTRACT

The invention is a distributor tray for a column (1) for heat and/or material exchange between a gas (G) and a liquid (L), comprising at least one means providing passage of the gas through the tray (2). The means has at least one chimney (4), defining on the surface of the tray (2) compartments (8) of substantially identical surface areas. Each compartment comprises at least one means (5) allowing passage of the liquid through the tray (2). The invention also has application to a gas/liquid contact column, a gas treatment unit, a $CO_2$ capture unit, a distillation unit, an offshore floating barge comprising such a distributor tray and a method of manufacturing the tray.

18 Claims, 8 Drawing Sheets

(Prior Art)

DISTRIBUTOR TRAY FOR OFFSHORE GAS/LIQUID CONTACT COLUMN

CROSS-REFERENCE TO RELATED APPLICATION

Reference is made to French Patent Application Serial No. 12/01.143, filed on Apr. 18, 2013, and a copending related application entitled "PARTITIONED DISTRIBUTOR TRAY FOR OFFSHORE GAS/LIQUID CONTACT COLUMN." filed on Apr. 17, 2013 which applications are incorporated herein by reference in their entirety.

BACKGROUND OF THE INVENTION

1. Field of the Invention

The present invention relates to offshore gas/liquid contact columns, and more particularly to offshore gas treatment, $CO_2$ capture, dehydration or distillation units.

2. Description of the Prior Art

Offshore gas treatment and/or $CO_2$ capture units using amine wash processes comprise liquid or gaseous fluid absorption and regeneration columns. These columns operate under counter-current or co-current gas/liquid flow conditions and, for example, are installed on vessels, floating barges or offshore platforms, of FPSO (Floating Production, Storage and Offloading) type or of FLNG (Floating Liquefied Natural Gas) type. Floating barges also comprise distillation columns or dehydration columns.

The columns used in these offshore gas treatment and/or $CO_2$ capture and/or distillation and/or dehydration units are generally based on the principle of a material and/or heat exchange between the gas and the fluid that circulate in the columns. FIG. 1 shows a particular case of a gas treatment column (1) equipped with a distributor tray at the column top. Conventionally, the gas treatment column (1) comprises several sections (3) filled by a contactor with a distributor tray (2) being arranged above each section (3). The gas/liquid contactor contacts gas (G) with liquid (L) for allowing exchanges.

The standard distributors (2) used in absorption/regeneration or distillation columns generally have a collector/distributor tray equipped with chimneys (4) (see FIG. 2). Distribution of the liquid occurs through passage thereof in orifices (5) positioned in the lower part of tray (2) and distribution of the gas occurs through chimneys (4). Each chimney (4) allows passage of the gas, according to the counter-current or co-current operating mode, from the lower part of the column to the upper part of column (1), or from the upper part to the lower part. Chimneys (4) project beyond one side of tray (2) and they are perpendicular thereto. Each chimney (4) has walls (parallelepipedic or cylindrical for example), which delimit an inner volume that is open on either side of tray (2). In order to prevent the liquid from passing through chimneys (4), the gas outlet or inlet opening above the tray (according to the counter-current or co-current mode) is preferably orthogonal to the longitudinal direction of chimney (4). The purpose of the distributor tray is to distribute liquid (L) homogeneously onto gas/liquid contactor (3).

The trays equipped with chimneys can be of different types and positioned according to different configurations. Different distributor tray variants are described notably in the following U.S. Pat. Nos. 6,338,774, and 6,149,136, 5,752,538, and U.S. published application 2004/020238.

The gas/liquid contact columns are placed on floating structures, of a vessel, platform or barge which are sensitive to wave motion. The equipments installed on these units, notably gas/liquid distributor trays, therefore undergo wave motions up to six degrees of freedom (yaw, pitch, roll, heave, sway, thrust).

By way of example, the angle associated with the combination of the pitch and roll oscillations is of the order of +/−5° with a period from 15 to 20 s. The orders of magnitude of the longitudinal, transverse and vertical accelerations encountered in the column range respectively between 0.2/0.7/0.2 m/s² 6 m above the deck where the column is arranged and 0.3/1.2/0.3 m/s² 50 m above the deck.

Under such conditions, the operation of conventional distributor trays equipped with chimneys (FIG. 2) can be greatly disturbed. Indeed, the operation of these distributors is mainly based on gravity, and a liquid guard level of homogeneous height "h" has to form on the distributor tray. The square of the velocity of flow of the liquid through orifices (5) in the lower part of tray (2) is proportional to the height of the liquid guard level ($U_L^2 \propto gh$). When tray (2) is inclined under the effect of the wave motion (FIG. 3), the height of the liquid level is no longer uniform on the distributor tray ($h_1 > h_2$), which causes an imbalance in the distribution of liquid at the inlet of gas/liquid contactor (3). The distribution quality and thus the efficiency of the column are greatly impacted. This poor distribution, if it is not controlled, can substantially degrade the performances of the column. A great liquid guard height (around 0.6 m) would be necessary to make up for these effects, which means bulk and weight increase, which is not suitable for offshore units.

In order to avoid this type of problem, distribution elements generally insensitive to horizontal variability have been used. These distributors generally have a collector and a distributor connected by one or more relatively long vertical lines so that the distributor remains on charge whatever the wave motion conditions are encountered. These distributors are generally insensitive to the effects of the wave motion and they generate a good distribution quality, but they are very bulky. The can be several meters high in some cases, such as disclosed in U.S. Published Application 2004/020238.

Another solution to these problems is described in French Patents 2,771,018 and 2,771,019. Two distributors (primary and secondary) are used. Each distributor is divided into compartments in which the liquid spreads. These compartments allow the liquid to be better distributed in case of inclination of the column. However, this option remains cumbersome because it requires two distributors. However, the compartments do not communicate with one another, resulting in the liquid not being evenly distributed in the compartments.

U.S. Pat. No. 5,132,055 discloses a distributor tray where the chimneys allow the liquid flow zone to be partitioned. Such a distributor tray is illustrated in FIG. 4. According to this document, the chimneys are then all parallel. The compartments thus all have a different surface area. The parallelism of the chimneys does not allow proper supply and good distribution of the liquid over the entire tray. Indeed, when the inclination of the tray is parallel to these chimneys, the height of liquid varies greatly between the two ends of the tray. Gas passes through orifices 12 in partitions 11 at a level above the liquid. The liquid passes through overflow flues 4 to drain liquid from the spaces 20.

SUMMARY OF THE INVENTION

The invention relates to a distributor tray comprising gas passage means and liquid passage means. The gas passage means are distributed in such a way that they form compartments to decrease the liquid guard height under the effect of the wave motion in order to guarantee proper supply and good distribution of the liquid over the entire tray.

The invention relates to a distributor tray for a column intended for heat and/or material exchange between a gas (G) and a liquid (L), comprising at least one means allowing passage of gas through a tray, the means having at least one wall. The wall defines, on the surface of the tray; the compartments have substantially identical surface areas, and each compartment comprises at least one means allowing passage of the liquid through the tray.

According to the invention, the means allowing passage of the gas includes at least one chimney projecting by a height H above one of the surfaces of the tray.

According to the invention, the tray comprises multiple gas passage means. The gas passage means are spaced to allow part of the liquid to flow between the compartments.

Advantageously, the tray comprises multiple gas passage means with the gas passage means being identical.

According to one embodiment, the tray is circular, and a first group of the gas passage means are oriented along a first diameter of the tray.

According to an embodiment, a second group of the gas passage means is oriented along a second diameter of the tray with the second diameter being substantially perpendicular to the first diameter.

According to an embodiment, the tray is circular, and a third group of the gas passage means is oriented to substantially form a concentric circle with the tray.

According to an embodiment, a fourth group of the gas passage means is oriented to separate the outer compartments made up of the first, second and third groups of the gas passage means into two identical parts.

The dimensions are preferably defined as follows:
a) Length L1 between two consecutive gas passage means of the third group ranges between 0 and 200 mm and preferably is between 0 and 100 mm,
b) Length L2 between a gas passage means (4) of the third group and an outer gas passage means ranges between 0 and 200 mm and preferably is between 0 and 100 mm,
c) Length L3 between the edge of the tray and the outer gas passage means ranges between 0 and 200 mm and preferably is between 0 and 100 mm,
d) Length Z of a compartment ranges between 20 and 2000 mm and preferably is less than $$\frac{50}{2\tan\theta}(mm)$$

with θ being the maximum imposed tray inclination angle.

Advantageously, the gas passage means are parallelepipedic.

In a variant, the liquid passage means are chimneys equipped with at least one perforation with the chimneys projecting above one of the surfaces of the tray.

Furthermore, the invention relates to an offshore gas/liquid contact column wherein two fluids are contacted by at least one gas/liquid contactor. The column comprises at least a first inlet for a liquid fluid, at least a second inlet for a gaseous fluid, at least a first outlet for a gaseous fluid and at least a second outlet for a liquid fluid. The column comprises a distributor tray as defined above which permits distribution of the fluids onto the contactor.

The invention furthermore relates to a gas treatment unit and/or to a $CO_2$ capture unit using gas washing with an absorbent solution, notably containing amines. The unit comprises at least one column according to the invention that allows exchanges between the gas and the absorbent solution.

The invention also relates to an offshore floating barge, notably for hydrocarbon recovery, comprising a gas treatment and/or $CO_2$ capture unit according to the invention or a distillation and/or dehydration unit according to the invention for cleaning the gases which are produced.

The invention also relates to a method of manufacturing a tray as described above wherein the following stages are carried out:
a) defining an imbalance index IQ for the tray wherein:

$$IQ(\%) = \frac{U_{L1} - U_{L2}}{(U_{L1} + U_{L2})/2}100$$

with $U_{L1}$ and $U_{L2}$ being the velocities of the liquid leaving the tray at two diametrically opposed ends of the tray;
b) selecting a maximum imbalance index for the tray and a maximum inclination angle θ for the tray with respect to the horizontal;
c) determining spacings (L1, L2, L3, Z) between the gas passage means permitting obtaining the maximum imbalance index; and
d) positioning the walls in compliance with the spacings.

BRIEF DESCRIPTION OF THE DRAWINGS

Other features and advantages of the device according to the invention will be clear from reading the description hereafter of embodiments given by way of non limitative example, with reference to the accompanying figures wherein.

DETAILED DESCRIPTION OF THE INVENTION

Figure 5:
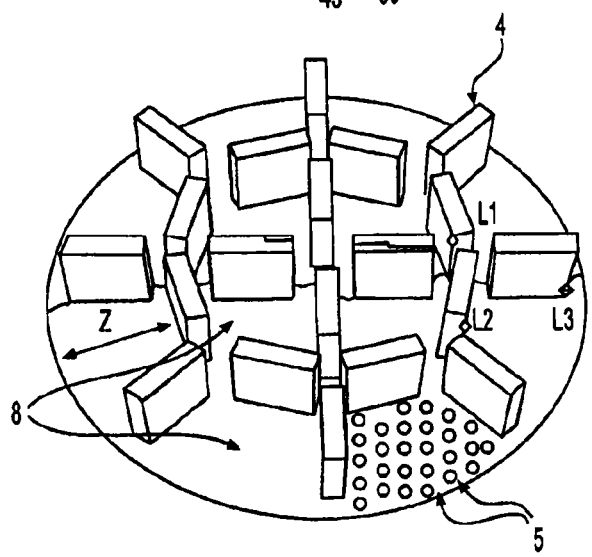
FIG. 5 illustrates a distributor tray according to an embodiment of the invention.
Figure 6:
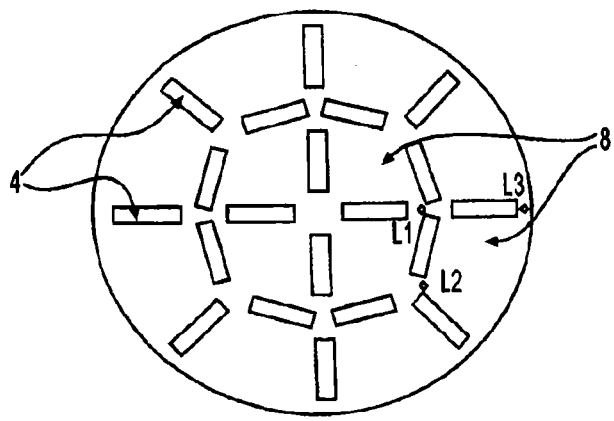
FIG. 6 illustrates a top view of a distributor tray according to the embodiment of FIG. 5.

FIGS. 5 and 6 illustrate a distributor tray according to the invention.

The invention relates to a distributor tray for a column (1) intended for heat and/or material exchange between a gas (G) and a liquid (L), conventionally comprising at least one gas passage means (a chimney for example) (4) permitting passage of the gas from one side of the tray to the other side, and at least one liquid passage means (an orifice for example) (5) allowing passage of the liquid from one side of the tray (2) to the other.

According to the invention, chimneys (4) are distributed in such a way that their parallelepipedic or cylindrical walls define compartments (8) on the surface of tray (2). The chimneys thus generate liquid compartments (8) and serve as "barriers" when the tray is inclined for maintaining a relatively homogeneous liquid guard level even in case of great inclination. Thus, a good quality of liquid distribution on the gas/liquid contactor is guaranteed. What is referred to as liquid guard is the interface between the gas and the liquid. The height of the liquid guard corresponds to the liquid level with respect to the upper surface of the tray. Furthermore, what is referred to as liquid flow zone is the zone on which the liquid circulates which is the upper side of the tray from which the chimneys project. According to the invention, the surface areas of compartments (8) are substantially identical (with variations of more or less 10%) to provide proper supply and good distribution of the liquid.

The chimneys (4) are spaced out and, by means of these spacings, the liquid can flow over the entire surface of distributor tray (2), thus providing good radial dispersion of the liquid. The lengths (L1, L2, L3 and Z for example) of the spacings are dimensioned to provide proper supply and good distribution of the liquid. Each compartment (8) and each spacing preferably comprises several orifices (5).

According to an embodiment of the invention, chimneys (4) are parallelepipedic, which facilitates their manufacture and installation. Advantageously, the chimneys are all identical. Orifices (5) provided in tray (2) can have a triangular or a square distribution pitch. Advantageously, the number of orifices (5) of tray (2) is larger than the number of chimneys (4). Furthermore, orifices (5) can have the same size or different sizes. Each compartment (8) comprises at least one orifice (5).

FIG. 6 illustrates a top view of a preferred embodiment of the location of the chimneys. In this figure, orifices (5) are not shown.

Preferably, the height of the chimneys is substantially identical to the conventional chimneys of the prior art. Thus the vertical space requirement of the distributor tray is not modified by the invention. Conventionally, the distributor tray is circular.

According to specific embodiments of the invention, the chimneys are distributed with the following positions, alone or in combination:

A first group of chimneys is oriented along a first diameter of the tray to separate the liquid flow zone into two half-discs. According to an embodiment, this first group of chimneys has four chimneys;

A second group of chimneys is oriented along a second diameter of the tray to separate the liquid flow zone into two half-discs. Preferably, the second diameter is perpendicular to the first diameter to form four identical disc portions. According to an embodiment, this second group of chimneys has four chimneys;

A third group of chimneys is oriented to substantially form a circle concentric to the tray. This circle separates the flow zone into two zones which are a first, inner zone and a second outer zone. According to an embodiment, the third group has eight chimneys. The spacing between two consecutive chimneys of the third group is L1. The distance between the edge of the tray and the chimneys of the third group is Z;

A fourth group of chimneys is oriented to separate into two substantially equal parts the outer compartments which is made up of the first, second and third groups. According to an embodiment, these chimneys are oriented at an angle of 45° to the chimneys of the first and second groups. The fourth group has four chimneys. The spacing between a chimney of the fourth group and a chimney of the third group is L2. The spacing between the edge of the tray and the outer chimneys is L3.

For this embodiment, distances Z, L1, L2 and L3 can be selected to optimize the flow of liquid over the entire liquid flow zone in order to provide good liquid distribution. Too large a spacing between chimneys leads to a guard height imbalance while remaining below the imbalance existing with the prior art. Too small a spacing reduces the fluid flow and can disturb the distribution of the liquid on the tray.

Figure 12:
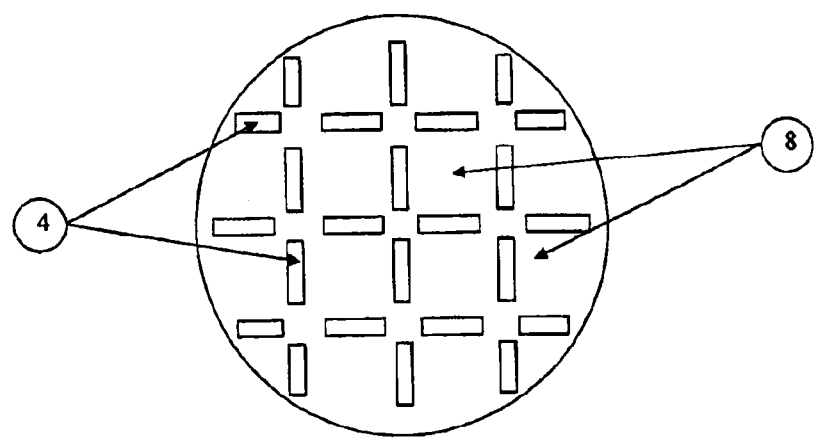
FIG. 12 illustrates a second embodiment of the invention.

However, other configurations can be considered for chimneys (4) (as shown in FIG. 12 for example). The number of chimneys (4) used and the configuration selected depend on the diameter of the tray. Indeed, the number of compartments is preferably larger on a tray of large diameter than on a tray of smaller diameter.

Figure 3:
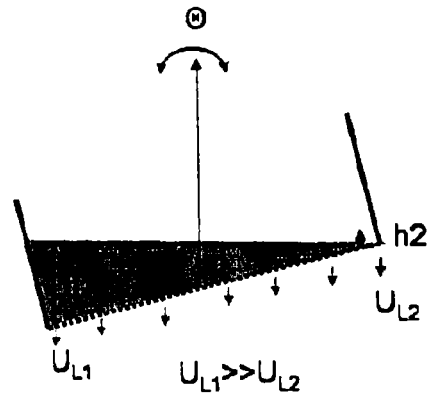
FIG. 3, already described, illustrates an inclined distributor tray according to prior art.

To characterize the sensitivity of the tray to the marine environment, an imbalance index is generally defined by the relation as follows:

$$IQ(\%) = \frac{U_{L1} - U_{L2}}{(U_{L1} + U_{L2})/2} 100 \quad \text{(Equation 1)}$$

with: $U_{L1,2}$ being the velocity of the liquid flowing from the orifices arranged at the ends of the distributor tray as shown in FIGS. 3 (prior art) and 11 (according to the invention). A low value of the imbalance index (IQ) indicates a good liquid distribution. On the other hand, a high IQ value indicates a great distribution imbalance and a high sensitivity to the wave motion undergone by the tray.

The characteristic distance Z to the edge of the tray can be optimized so as to minimize the imbalance index. Depending on the characteristics of the tray and on the operating conditions, it is possible for the maximum inclination angle θ of the tray with respect to the horizontal imposed by the marine environment, to define an optimum length for Z with the combination of the following formulations:

$$\begin{cases} h_{max} = h_0 + Z\tan\theta \\ h_{min} = h_0 - Z\tan\theta \\ \Delta h = h_{max} - h_{min} = 2Z\tan\theta \\ U_{L1} \propto c_f \sqrt{2gh_{max}} \\ U_{L2} \propto c_f \sqrt{2gh_{min}} \end{cases}$$

with:

$c_f$ being the friction coefficient at the orifice, $h_0$ being the height at equilibrium (θ=0°) of the liquid guard in a compartment of the distributor tray, $h_{max}$ being the maximum height of liquid guard in a compartment of the distributor tray, $h_{min}$ being the minimum height of liquid guard in a compartment of the distributor tray, $U_{L1}$ and $U_{L2}$ being liquid velocity at the orifice, and sign ∝ means proportional to.

It is thus possible to determine a length Z as a function of the geometry of the tray and the marine conditions to meet a given imbalance index. For example, in order to have an imbalance index IQ<10%, it is necessary to have Δh≤50 mm, therefore Z has to be less than:

$$Z \le \frac{50}{2\tan\theta} (mm).$$

Alternatively, in order to optimize the distribution of the liquid between compartments (8), a minimum flow can be guaranteed while keeping a homogeneous volume of liquid over the entire tray by imposing lengths ranging between 0 and 200 mm and preferably between 0 and 100 mm for the various spacings. For the embodiment illustrated in FIG. 5, the following configuration can be selected:

a) Length L1 between two consecutive chimneys (4) of the third group ranges between 0 and 200 mm.

b) Length L2 between a chimney (4) of the third group and an outer chimney (4) ranges between 0 and 200 mm.

c) Length L3 between the edge of the tray and the outer chimneys ranges between 0 and 200 mm.

d) Length Z of a compartment depends on the diameter of the tray and on the marine conditions encountered. Length Z ranges between 20 and 2000 mm and it is preferably less than $$\frac{50}{2\tan\theta} (mm)$$

with θ being the maximum tray inclination angle imposed by the marine environment.

One of the lengths (L1, L2 and L3) can be zero but however, in that case, the other two spacings must be sufficient for liquid circulation.

Figure 13:
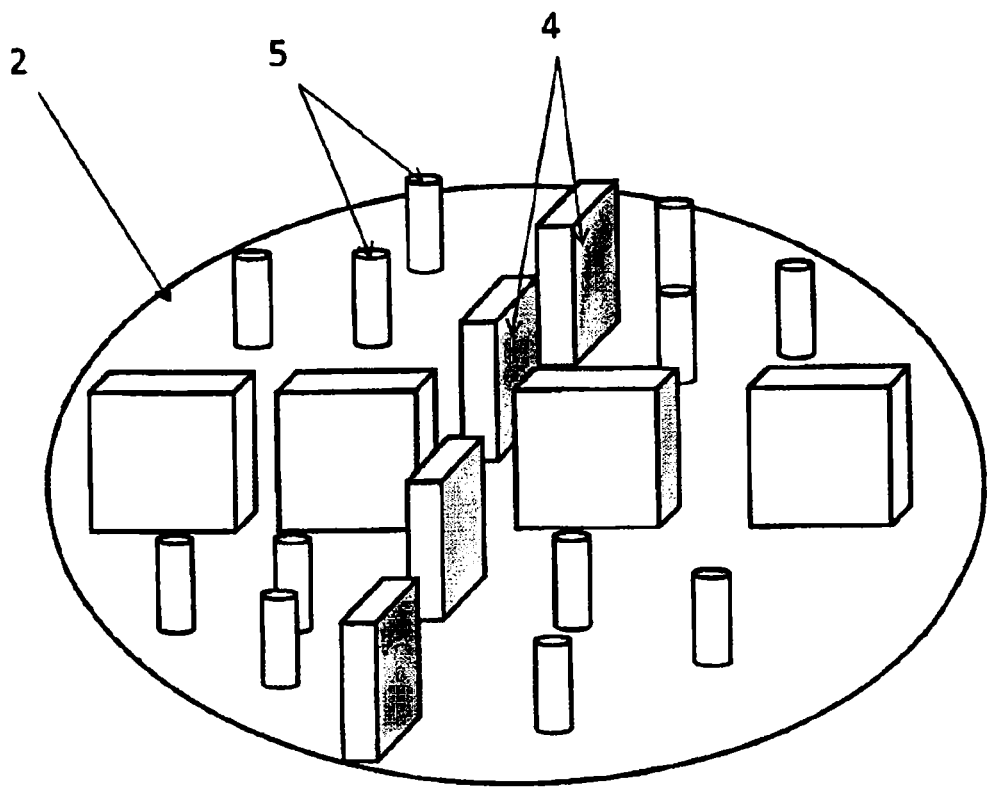
FIGS. 13 and 14 illustrate another embodiment of the invention. Liquid passages, that are chimneys (4), have at least one perforation (9) and for passing liquid which project upward from the top surface of the tray and other chimneys (4) pass gas in a manner as disclosed in U.S. Pat. No. 5,132,055.
Figure 14:
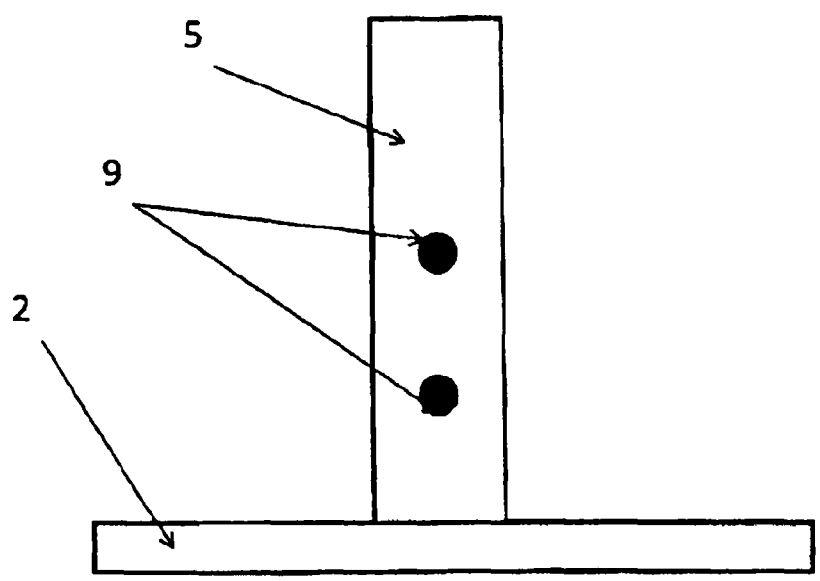

In a variant of the preferred embodiment of the invention, the following characteristics can be modified:

The compartments have a substantially triangular shape as shown in FIG. 13;

The compartments have a substantially hexagonal shape (of honeycomb type for example);

The compartments have a substantially rectangular shape with the chimneys being perpendicular as shown in FIG. 12;

The chimneys have a square base and chimneys are juxtaposed to form walls delimiting the compartments; and Liquid passage means (5) are chimneys (4) equipped with at least one perforation (9) for passing gas (or at least one row of perforations) with the chimneys for passing gas and for passing liquid project upward from the surfaces of the tray (2) as shown in FIGS. 13 and 14.

The invention also relates to an offshore absorption or regeneration column (1) wherein two fluids are contacted by means of a gas/liquid contactor (3), the column (1) comprising at least a first inlet for a liquid fluid, at least a second inlet for a gaseous fluid, at least a first outlet for a gaseous fluid and at least a second outlet for a liquid fluid. Column (1) also comprises a distributor tray (2) as described above, allowing distribution of the fluids on the contactor (3).

Advantageously, gas/liquid contactor (3) is a stacked or random packed bed. Distributor tray (2) can be associated with a dispersion system arranged below the distributor tray. This dispersion system can be a set of sprinklers or of perforated lines arranged in parallel below the distributor tray. This dispersion system provides good dispersion of the liquid in the gas/liquid contactor.

The tray according to the invention is also suited for distillation columns and dehydration columns.

Furthermore, the invention relates to a gas treatment and/or $CO_2$ capture unit using gas washing with an absorbent solution containing amines for example. The unit comprises at least one column (1) as defined above that allows exchanges between the gas and the absorbent solution, and mainly between the gas and the amines that may be contained in this solution.

Finally, the invention relates to an offshore floating barge of FPSO or FLNG type, notably for hydrocarbon production and treatment. The barge comprises a gas treatment and/or $CO_2$ capture unit according to the invention or a distillation and/or dehydration unit as described above for cleaning the gases produced.

According to an embodiment, the dimensions of the tray and of its components match the following intervals:

The height of distributor tray (2) ranges between 100 and 2000 mm and preferably between 600 and 1000 mm;

The diameter of tray (2) ranges between 400 and 5000 mm;

The length of chimneys (4) ranges between 50 and 1200 mm and preferably between 50 and 700 mm;

The height of chimneys (4) ranges between 300 and 1000 mm and preferably between 400 and 700 mm; and Distances L1, L2 and L3 range between 0 and 200 mm and preferably between 0 and 100 mm.

Figure 11:
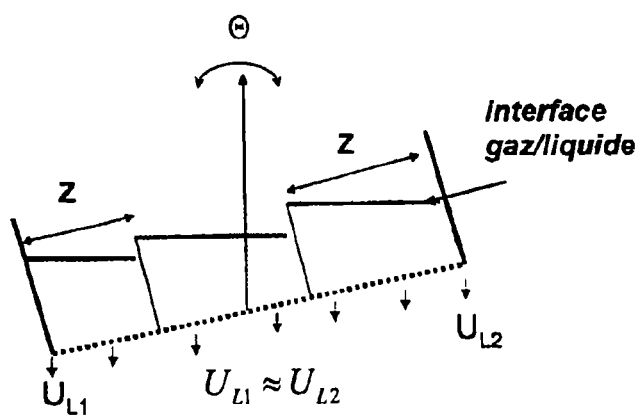
FIG. 11 illustrates the distributor tray of the invention in AN inclined position.

Furthermore, the invention relates to a method of manufacturing a distributor tray as described above, wherein the following stages are carried out:

a) first selecting a configuration of chimneys (4) on the tray (2) by determining a number of chimneys to be used and the way to position them as for example according to the embodiment of FIG. 5, b) defining an imbalance index IQ for the tray wherein:

$$IQ(\%) = \frac{U_{L1} - U_{L2}}{(U_{L1} + U_{L2})/2} 100$$

with $U_{L1}$ and $U_{L2}$ being the velocities of the liquid leaving the tray at two diametrically opposed ends of the tray (FIG. 11);

c) selecting a maximum imbalance index for the tray (2) and a maximum inclination angle θ for the tray with respect to the horizontal by fixing an imbalance index as a function of the column operating limits (linked with the wave motion for example);

d) determining spacings (L1, L2, L3 and Z) between the gas passage means (4) permitting obtaining the maximum imbalance index; and e) positioning the walls in compliance with the spacings.

COMPARATIVE EXAMPLE

Figure 4:
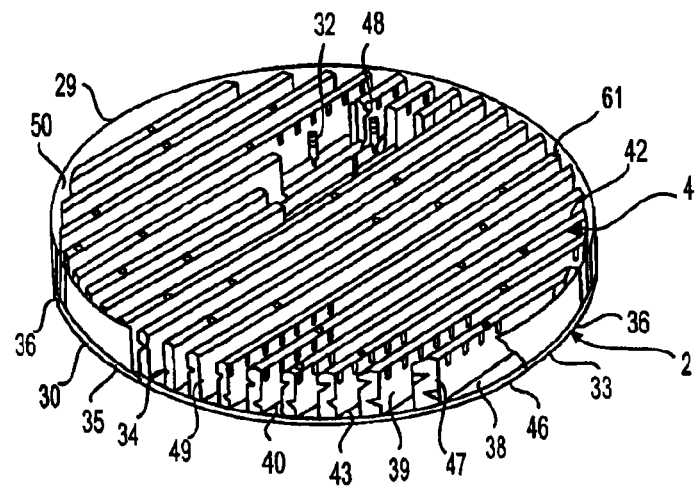
FIG. 4, already described, illustrates a distributor tray according to prior art.

In order to illustrate the advantages of the invention, a comparison is made of the results obtained with the invention (FIG. 5) with those obtained with a "conventional" distributor tray (FIG. 2) and those obtained with a distributor tray as described in U.S. Pat. No. 5,132,055 (FIG. 4). A numerical approach is used of CFD type (Computational Fluid Dynamics) that studies the movements of a fluid, or their effects, through the numerical solution of the equations governing the fluid.

The numerical approach used is of Volume-of-Fluid interface tracking type as described in Hirt & Nichols, JCP 39, 201-225 (1981). This method, which is well known, is suited for simulating the change in interface topology encountered in the distributor subjected to wave motion (detachment, interface reconnection, breaker formation, . . . ). The evolution of the two-phase flow is described by the mass conservation and momentum conservation equations, and by the presence rate transport equation.

Calculations were carried out with the commercial software Fluent 13® (ANSYS, USA).

For all the CFD evaluation calculations presented hereafter, the angle associated with the simulated roll motion is +/−5° with a 15 s period. The properties of the fluids are: $\rho_L$=1055 kg/m3, $\mu_L$=2.5 cp, $\rho_G$=55 kg/m3 and $\mu_G$=0.013 cp. The liquid guard height on the distributor being considered is 400 mm. A distance to the gyration point of the offshore platform of 50 m is taken into account in the calculations. This distance corresponds to the distributors arranged at the top of the column, subjected to the highest accelerations. Finally, the capillary effects are assumed to be negligible.

The distribution efficiency of the invention is compared with that of a "conventional" distributor tray (FIG. 2) and with that of a specific distributor tray (FIG. 4) in cases where the tray undergoes wave motions. The sensitivity of the tray to the marine environment is quantified by the imbalance index defined by Equation (1).

Example 1

Figure 1:
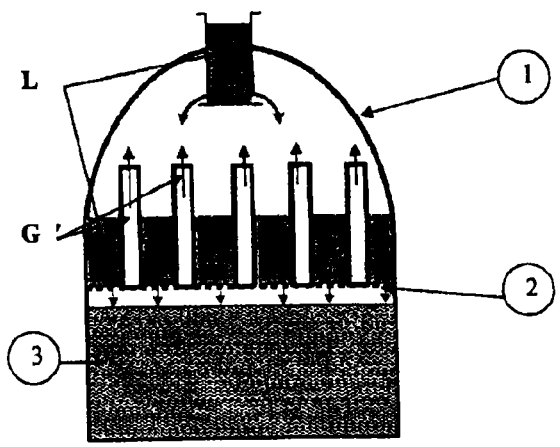
FIG. 1, already described, illustrates the particular case of a gas treatment or $CO_2$ capture column equipped with a distributor tray at the column top.
Figure 2:
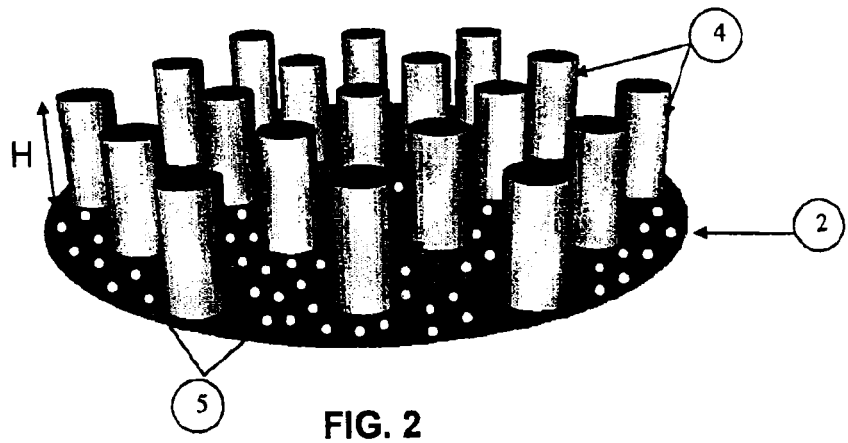
FIG. 2, already described, illustrates a distributor tray according to prior art.

Properties of the Standard Tray (Prior Art of FIG. 2)

Diameter of the distributor tray is 4150 mm.
Diameter of the gas chimneys is 350 mm.
Height of the gas chimneys is 700 mm.
Triangular pitch P of the gas chimneys is 200 mm.
Minimum distance to the edge of the gas chimneys is 100 mm.
Number of chimneys is 19.
Tray porosity (chimney surface area/total surface area) is 13.5.

Example 2

Properties of the Tray of U.S. Pat. No. 5,132,055 (FIG. 4)

Diameter of distributor tray (2) is 4150 mm.
Thickness of gas chimneys (4) is 70 mm.
Height of gas chimneys (4) is 700 mm.
Pitch between gas chimneys (4) is 200 mm.
Minimum distance to the edge of chimneys (4) is 110 mm.

Example 3

Properties of the Tray According to the Invention (Chimney Distribution According to the Embodiment of FIG. 5)

Diameter of distributor tray (2) is 4150 mm.
Height of gas chimneys (4) is 700 mm.
Distance L1 is 0 mm.
Distance L2 is 82 mm.
Distance L3 is 50 mm.
Distance Z is 925 mm.

Figure 7A:
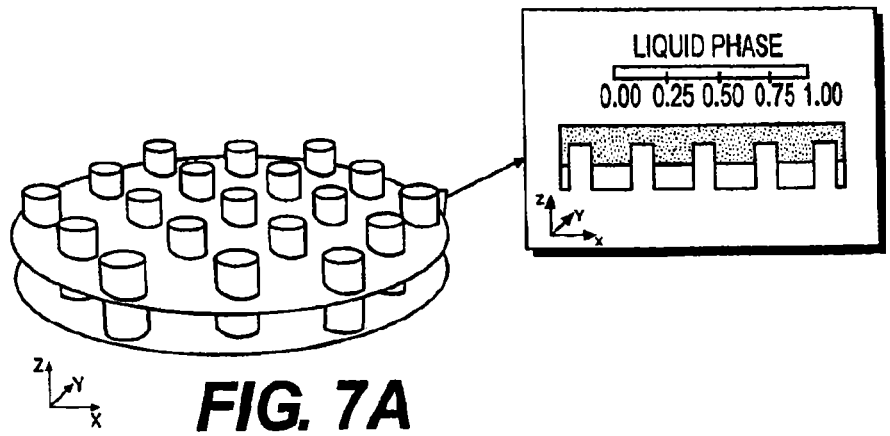
FIGS. 7a) to 7c) illustrate the evolution of the liquid guard level for three angular positions (0°, 5° and −5°) of a conventional tray according to the prior art of FIG. 2.
Figure 7B:
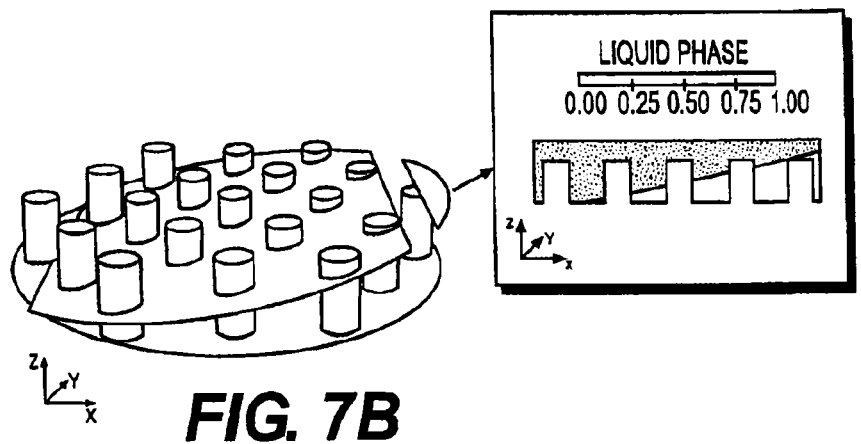
Figure 7C:
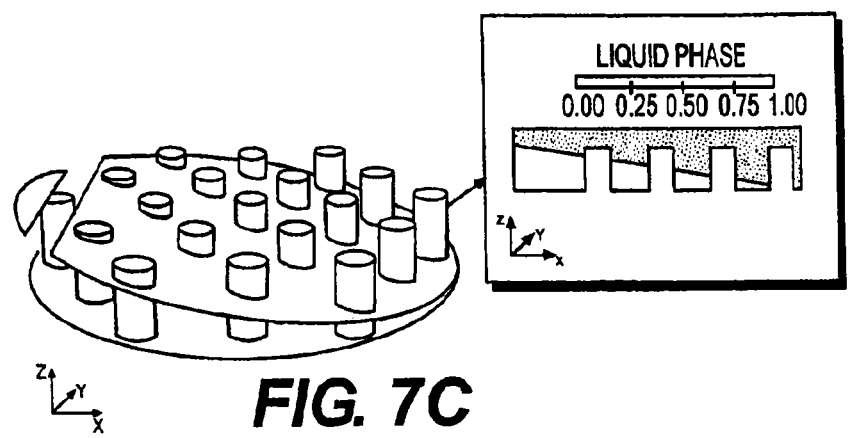
Figure 9A:
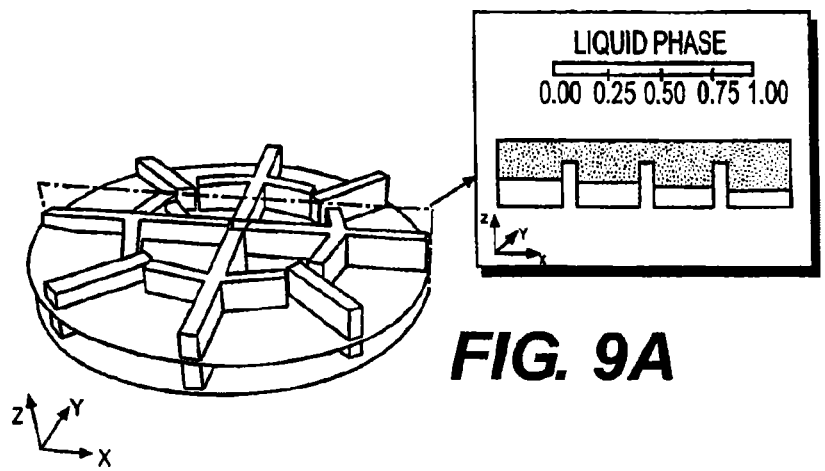
FIGS. 9a) to 9c) illustrate the evolution of the liquid guard level for three angular positions (0°, 5° and −5°) of the tray according to the embodiment of FIG. 5.
Figure 9B:
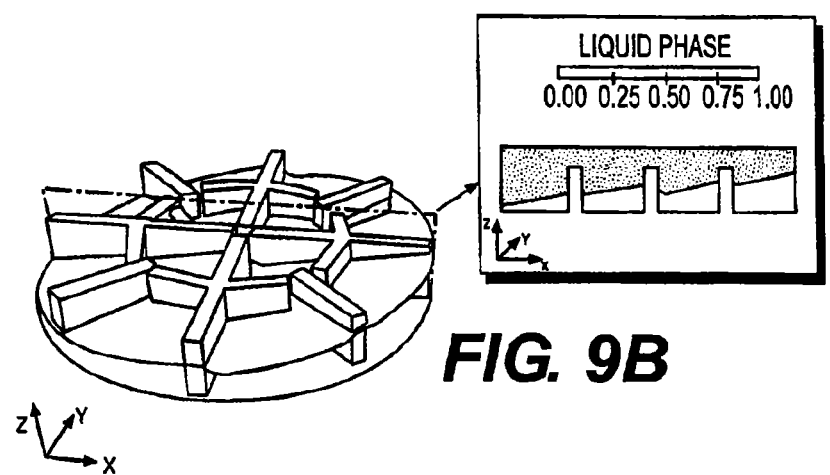
Figure 9C:
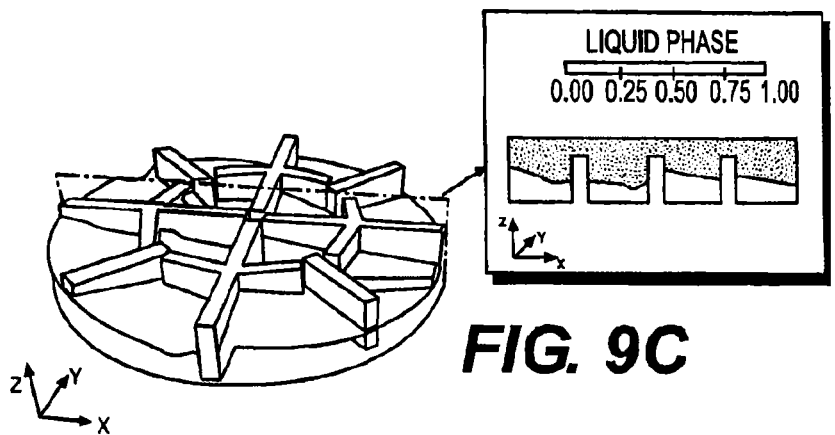
Figure 8A:
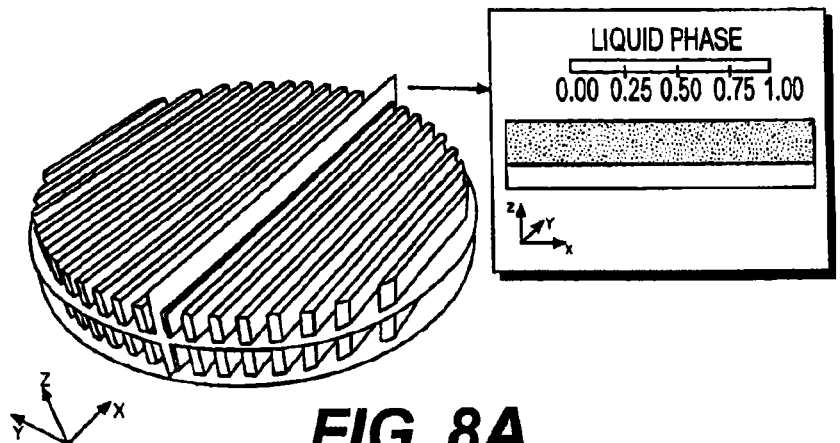
FIGS. 8a) to 8c) illustrate the evolution of the liquid guard level for three angular positions (0°, 5° and −5°) of a specific tray according to the prior art of FIG. 4.
Figure 8B:
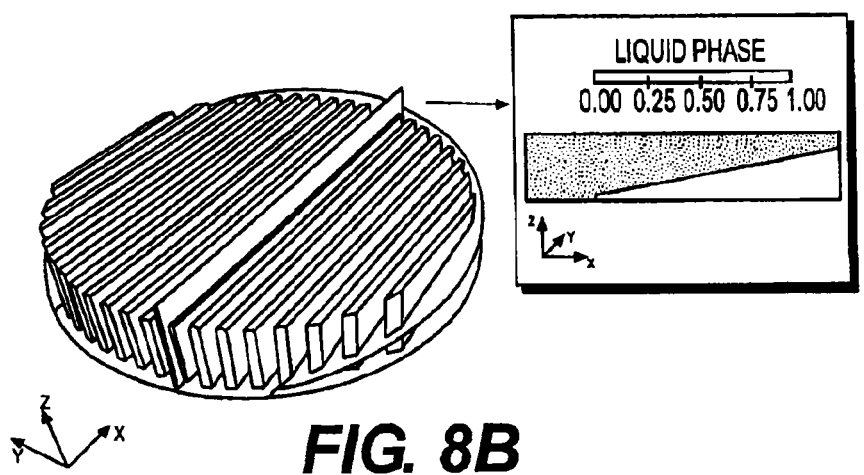
Figure 8C:
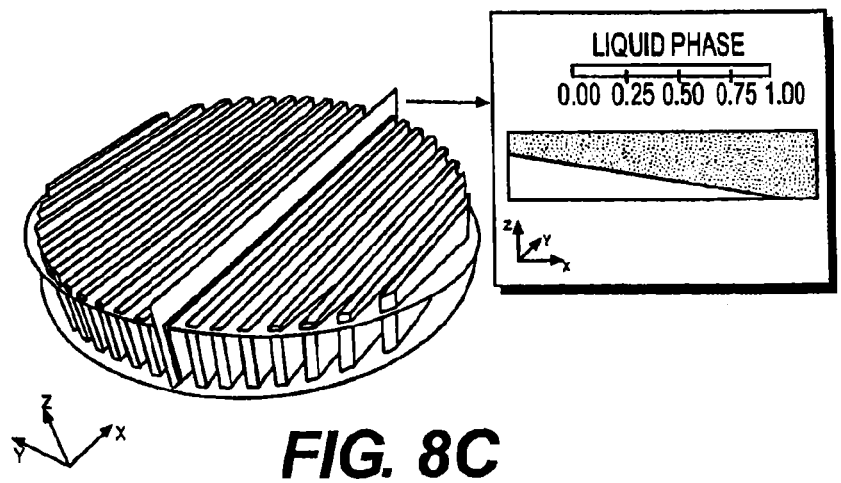

FIGS. 7, 8 and 9 show the evolution of the liquid guard (gas/liquid interface) on the distributor when it is subjected to wave motions, for examples 1, 2 and 3 respectively. The results are obtained from dynamic CFD type calculations. The figures show different instants corresponding to different extreme positions. FIGS. 7a), 8a) and 9a) show the trays in a horizontal position (θ=0°); FIGS. 7b), 8b) and 9b) show the trays in a first extremal position (θ=5°) corresponding to a wave motion; and FIGS. 7c), 8c) and 9c) show the trays in a second extremal position opposite the first extremal position (θ=−5°). The right part of FIGS. 7, 8 and 9 illustrates the variation of the liquid guard height in a plane passing through a diameter of the tray.

The results clearly show that the "conventional" distributor tray is highly sensitive to the effects of wave motion.

On the other hand, for the device according to the invention, the results show that the liquid guard remains quite homogeneous on the distributor tray despite the wave motion, thus providing good distribution quality.

Figure 10:
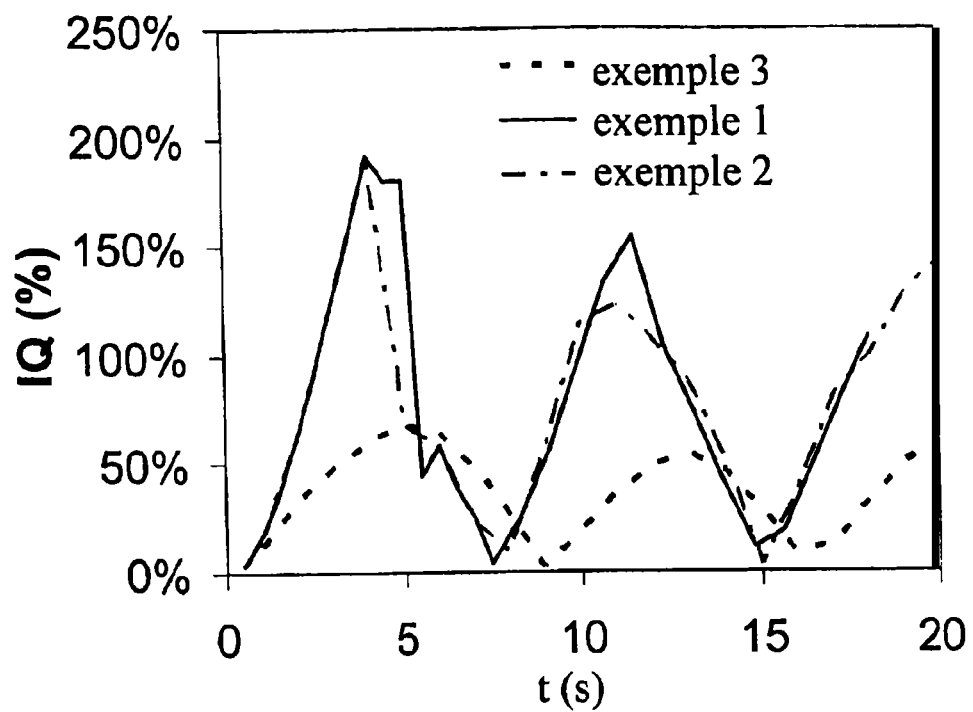
FIG. 10 is a comparative curve between the invention and the prior art.

These results are quantified in FIG. 10 that compares the imbalance index obtained with the three distributor trays. For the "conventional" tray (example 1), the imbalance index ranges between 0% and 200% over a period of oscillation of the tray with a 200% peak when the angle of inclination reaches its maximum level, i.e. 5°. It should be noted that the value of 200% indicates that part of the distributor tray is no longer in contact with the liquid (see FIGS. 7b) and 7c)). Over a period of 15 s, the mean maldistribution rate of the "conventional" distributor is 80%.

When the inclination of the tray described in U.S. Pat. No. 5,132,055 (example 2) which is parallel to the chimneys, the distributor tray remains very sensitive to wave motions with the imbalance index also ranging between 0% and 200%. Over a period of 15 s, the mean maldistribution rate of the distributor tray is 73%, close to the 80% of the "conventional" tray.

On the other hand, the tray according to the invention (example 3) has significantly better performances. Indeed, the imbalance index ranges between 0% and 60%. Therefore, no part of the tray is drained, at any time, and the mean maldistribution rate for a period of 15 s is 40%. It can be noted that, due to the distribution of the chimneys, the imbalance index remains low whatever the direction of the tray inclination. To reach results equivalent to those obtained with the system provided using the "conventional" tray, a liquid guard height of about 650 mm would be necessary, which would further increase the size and the weight (weight of the liquid) of this tray, with higher gas chimneys in order to prevent obstruction thereof, and increase its cost in comparison with the system provided. This example shows that the invention allows a significant gain in size and distribution efficiency in a floating environment.

The invention claimed is:

1. A distributor tray for a column for at least one of heat and material exchange between a gas and a liquid, comprising:
a plurality of passages, each passage providing passage of gas from a bottom side of the tray through the tray to a top side of the tray and which projects upward from the top side of the tray, the plurality of passages comprising a plurality of groups of passages, each group of passages respectively surrounding an individual tray compartment with the individual tray compartments being of substantially equal surface area and each tray compartment including at least one passage for passing liquid through the tray.

2. A tray as claimed in claim 1, wherein the plurality of passages providing passage of the gas to the top side include chimneys projecting upward from the top side of the tray.

3. A tray as claimed in claim 2, wherein each group of passages comprises gas passages which are spaced apart to permit part of the liquid to flow between the tray compartments.

4. A tray as claimed in claim 1, wherein the group of passages surrounding each tray compartment of substantially equal surface area comprise identical passages.

5. A tray as claimed in claim 2, wherein the group of passages surrounding each tray compartment of substantially equal surface area comprise identical passages.

6. A tray as claimed in claim 3, wherein the group of passages surrounding each tray compartment of substantially equal surface area comprise identical passages.

7. A tray as claimed in claim 4, wherein the tray is circular and a first group of passages is oriented along a first diameter of the tray, and a second group of passages is oriented along a second diameter of the tray with the second diameter being substantially perpendicular to the first diameter.

8. A tray as claimed in claim 5, wherein a second group of passages is oriented along a second diameter of the tray with the second diameter being substantially perpendicular to a first diameter.

9. A tray as claimed in claim 6, wherein a second group of passages is oriented along a second diameter of the tray with the second diameter being substantially perpendicular to a first diameter.

10. A tray as claimed in claim 4, wherein the tray is circular and a third group of passages is oriented to substantially form a concentric circle on the tray.

11. A tray as claimed in claim 10, comprising a fourth group of passages oriented to separate outer tray compartments into two identical parts with the outer tray compartments comprising the first, second and third groups of the passages.

12. A tray as claimed in claim 11, comprising:
   a) a length L1 extending between two consecutive passages of the third group which ranges between 0 and 200 mm;
   b) a length L2 extending between a passages of the third group and an outer passage which ranges between 0 and 200 mm;
   c) a length L3 extending between an edge of the tray and the outer passage which ranges between 0 and 200 mm; and
   d) a length Z of a tray compartment which ranges between 20 and 2000 mm.

13. A tray as claimed in claim 12 wherein the length L2 ranges between 0 and 100 mm, the length L2 ranges between 0 and 100 mm, the length L3 ranges between 0 and 100 mm and Z is less than $$\frac{50}{2\tan\theta}(mm)$$

with $\theta$ being a maximum tray inclination angle.

14. A tray as claimed in claim 1, wherein the passages are parallelepipedic.

15. A tray as claimed in claim 1, wherein the tray comprises an offshore distributor and liquid passages are chimneys having at least one perforation and which project upward from the top surface of the tray.

16. An offshore gas and liquid contact column wherein two fluids are contracted by at least one gas and liquid contactor with the contact column comprising at least a first inlet for a liquid fluid, at least a second inlet for a gaseous fluid, at least a first outlet for the gaseous fluid and at least a second outlet for the liquid fluid, and the contact column comprises a plurality of passages, each passage providing passage of gas from a bottom side of the tray through the tray to a top side of the tray and which projects upward from the top side of the tray, the plurality of passages comprising a plurality of groups of passages, each group of passages respectively surrounding an individual tray compartment with the individual tray compartments being of substantially equal surface area, and each tray compartment including at least one passage for passing fluids through the tray for distributing the fluids onto the contactor.

17. An offshore gas and liquid column in accordance with claim 16 wherein two fluids are contacted by at least one gas and liquid contractor and comprising at least one of a gas treatment and $CO_2$ capture unit providing gas washing with an absorbent solution containing amines.

18. An offshore gas and liquid column in accordance with claim 16 wherein two fluids are contacted by at least one gas and liquid contactor and comprising at least one of a gas distillation and dehydration unit.

* * * * *